US012179143B2

(12) United States Patent
Zanjani et al.

(10) Patent No.: US 12,179,143 B2
(45) Date of Patent: Dec. 31, 2024

(54) FLUE GAS DECARBONIZATION

(71) Applicant: Air Products and Chemicals, Inc., Allentown, PA (US)

(72) Inventors: Mozhgan Alimohammadi Zanjani, Flemington, NJ (US); David Ross Graham, Harleysville, PA (US); Donald E. Henry, Allentown, PA (US); Donn Michael Herron, Fogelsville, PA (US); Roger Anthony Dewing, Fleet (GB)

(73) Assignee: Air Products and Chemicals, Inc., Allentown, PA (US)

(*) Notice: Subject to any disclaimer, the term of this patent is extended or adjusted under 35 U.S.C. 154(b) by 304 days.

(21) Appl. No.: 17/751,081

(22) Filed: May 23, 2022

(65) Prior Publication Data
US 2023/0233986 A1 Jul. 27, 2023

Related U.S. Application Data

(60) Provisional application No. 63/301,520, filed on Jan. 21, 2022.

(51) Int. Cl.
*B01D 53/047* (2006.01)
*B01D 53/22* (2006.01)
(Continued)

(52) U.S. Cl.
CPC ....... *B01D 53/0476* (2013.01); *B01D 53/229* (2013.01); *B01J 20/18* (2013.01);
(Continued)

(58) Field of Classification Search
CPC .... B01D 53/0476; B01D 53/04; B01D 53/22; B01D 53/229; B01D 2253/108;
(Continued)

(56) References Cited

U.S. PATENT DOCUMENTS 4,329,158 A * 5/1982 Sircar ................. B01D 53/047
95/99
4,375,363 A * 3/1983 Fuderer .................. C01B 3/025
252/375
(Continued)

FOREIGN PATENT DOCUMENTS

| EP | 1114485 B1 | 5/2006 |
| EP | 1483036 B1 | 7/2008 |
| EP | 2141119 A1 | 1/2010 |

*Primary Examiner* — Frank M Lawrence, Jr.
(74) *Attorney, Agent, or Firm* — Jason M. Ploeger

(57) ABSTRACT

A process for separating carbon dioxide from a feed gas comprising carbon dioxide may comprise compressing the feed gas in a feed gas compressor to produce a compressed feed gas. The process may also comprise separating the compressed feed gas by an adsorption process comprising: using a plurality of adsorbent beds to produce a carbon dioxide-enriched product stream and a carbon dioxide-depleted stream, and a blowdown step. A blowdown gas may be removed from the adsorbent bed. The process may also comprise compressing the blowdown gas in the feed gas compressor and combining the blowdown gas with the compressed feed gas.

11 Claims, 7 Drawing Sheets

(51) Int. Cl.
  *B01J 20/18* (2006.01)
  *C01B 32/50* (2017.01)

(52) U.S. Cl.
  CPC ........ *C01B 32/50* (2017.08); *B01D 2253/108* (2013.01); *B01D 2257/504* (2013.01); *B01D 2259/404* (2013.01); *B01D 2259/4062* (2013.01); *C01B 2210/0018* (2013.01)

(58) Field of Classification Search
  CPC ........ B01D 2257/504; B01D 2259/404; B01D 2259/4062; B01D 2256/22; B01D 2258/0283; B01D 2259/40001; B01D 2259/40028; B01D 2259/40035; B01D 2259/65; B01D 53/047; B01J 20/18; C01B 32/50; C01B 2210/0018; Y02C 20/40
  USPC ...... 95/96, 139, 148, 51; 96/4, 121; 423/230
  See application file for complete search history.

(56) References Cited

U.S. PATENT DOCUMENTS

| | | | | |
|---|---|---|---|---|
| 4,770,676 | A * | 9/1988 | Sircar | B01D 53/047 95/99 |
| 5,938,819 | A * | 8/1999 | Seery | B01D 53/053 95/902 |
| 8,709,136 | B2 | 4/2014 | Hsu et al. | |
| 2007/0227352 | A1* | 10/2007 | Kumar | B01D 53/0476 95/96 |
| 2012/0279391 | A1* | 11/2012 | Kumar | B01D 53/0476 95/26 |
| 2013/0239807 | A1* | 9/2013 | Weist, Jr. | B01D 53/047 95/100 |
| 2016/0256820 | A1* | 9/2016 | Kulkarni | F25J 3/067 |
| 2019/0001263 | A1* | 1/2019 | Prince | F25J 3/0209 |
| 2021/0346837 | A1 | 11/2021 | Ritter et al. | |

* cited by examiner

FLUE GAS DECARBONIZATION

CROSS-REFERENCE TO RELATED APPLICATION

This Application claims priority to U.S. Provisional Patent Application No. 63/301,520, filed Jan. 21, 2022.

BACKGROUND

The present disclosure relates generally to reducing emissions from exhaust streams containing carbon dioxide and, more specifically, to systems and methods of reducing emissions by recovering carbon dioxide from an exhaust gas stream using a pressure swing adsorption system.

Industrial processes such as power generation will need to capture carbon dioxide (CO2) to mitigate the effects of climate change. Typically, these processes produce a flue gas in which the CO2 is at low pressure and concentration due to the high amounts of inert nitrogen contributed by the air, both factors contributing to the high cost of carbon capture from flue gases.

Hsu et al. (U.S. Pat. No. 8,709,136) teach an adsorption process to separate a high-purity CO2 stream in which the product CO2 from the beds is withdrawn under vacuum and blowdown gas is recycled utilizing a dedicated rinse compressor to provide rinse gas to improve recovery and purity. However, the adsorption cycle in Hsu et al. was optimized for feeds such as syngas that have a higher pressure and higher concentration of CO2.

Ritter et al. (US 2021/0346837) also teach an adsorption process to separate a high-purity CO2 stream in which the product CO2 from the beds is withdrawn under vacuum. The feed to the adsorption process is only pressurized with a blower to about 1.2 bara to eliminate the cost of adding a compressor. Unless otherwise specified, pressures are cited in the present disclosure in absolute units of bara.

There is a need for a process to capture carbon dioxide from flue gas at a lower net energy cost with a reduction in the number and size of capital equipment.

SUMMARY

The present disclosure relates to a process using adsorption to capture carbon dioxide from flue gas. The flue gas is compressed prior to entering the adsorption process, and the same compressor is used to recycle blowdown gas from the adsorption process. The high pressure carbon-dioxide depleted gas leaving the adsorption process allows the use of a membrane to recover additional CO2 for recycle and/or the recovery of energy using a turbine.

An important variable in designing the adsorption process is the partial pressure of CO2 in the feed to the adsorption process. The ideal range of partial pressure is a function of the adsorbent material.

Aspect 1: A process for separating carbon dioxide from a feed gas comprising carbon dioxide, the process comprising compressing the feed gas in a feed gas compressor to produce a compressed feed gas; separating the compressed feed gas by an adsorption process comprising using a plurality of adsorbent beds to produce a carbon dioxide-enriched product stream and a carbon dioxide-depleted stream, and a blowdown step during which a blowdown gas is removed from the adsorbent bed; and compressing the blowdown gas in the feed gas compressor and combining the blowdown gas with the compressed feed gas.

Aspect 2: A process according to Aspect 1, further comprising reducing the pressure of the blowdown gas prior to compression in the feed gas compressor.

Aspect 3: A process according to Aspect 1 or Aspect 2, further comprising expanding the carbon dioxide-depleted stream to generate power.

Aspect 4: A process according to any of Aspects 1 to 3, further comprising expanding a stream derived from the carbon dioxide-depleted stream to generate power.

Aspect 5: A process according to any of Aspects 1 to 4, further comprising separating the carbon dioxide-depleted stream by selective permeation to produce a carbon dioxide-enriched permeate stream and a carbon dioxide-lean retentate stream; and compressing the carbon dioxide-enriched permeate stream in the feed gas compressor.

Aspect 6: A process according to any of Aspects 1 to 5, further comprising indirectly transferring heat energy from the compressed feed gas to the carbon dioxide-depleted stream.

Aspect 7: A process according to any of Aspects 1 to 6, wherein the partial pressure of carbon dioxide in the compressed feed gas is maintained between 0.5 and 3.5 bara.

Aspect 8: A process according to any of Aspects 1 to 7, wherein the adsorbent bed comprises a standard zeolite 13X material, a NaY zeolite material, or combinations thereof.

Aspect 9: A process for separating carbon dioxide from a feed gas comprising carbon dioxide, the process comprising compressing the feed gas to produce a compressed feed gas; separating the compressed feed gas by an adsorption process using a plurality of adsorbent beds comprising an adsorbent material to produce a carbon dioxide-enriched product stream and a carbon dioxide-depleted stream; wherein the partial pressure of carbon dioxide in the compressed feed gas is maintained within a given pressure range; and wherein the given pressure range is a function of the adsorbent material.

Aspect 10: A process according to Aspect 9, wherein the adsorbent bed comprises a standard zeolite 13X material; and wherein the given pressure range is between 0.5 and 3.5 bara.

Aspect 11: A process according to Aspect 9, wherein the adsorbent bed comprises a NaY zeolite material; and wherein the given pressure range is between 0.5 and 3.5 bara.

Aspect 12: A system for separating carbon dioxide from a feed gas comprising carbon dioxide, the system comprising a feed gas compressor configured to receive a feed gas and produce a compressed feed gas; a plurality of adsorbent beds configured to receive the compressed feed gas and produce a carbon dioxide-enriched product stream and a carbon dioxide-depleted stream, and wherein a blowdown gas is removed therefrom; and a blowdown gas conduit configured to accept the blowdown gas wherein the feed gas compressor is in fluid flow communication with the blowdown gas conduit.

Aspect 13: A system according to Aspect 12, wherein the blowdown gas conduit comprises a pressure reducer.

Aspect 14: A system according to Aspect 12 or Aspect 13, further comprising an expander configured to accept the carbon dioxide-depleted stream to generate power.

Aspect 15: A system according to any of Aspects 12 to 14, further comprising an expander configured to accept a stream derived from the carbon dioxide-depleted stream to generate power.

Aspect 16: A system according to any of Aspects 12 to 15, further comprising a single membrane stage, a plurality of membrane stages, or combinations thereof configured to receive the carbon dioxide-depleted stream to produce a carbon dioxide-enriched permeate stream and a carbon dioxide-lean retentate stream; and a permeate conduit configured to accept the carbon dioxide-enriched permeate stream; wherein the permeate conduit is in fluid flow communication with the feed gas compressor.

Aspect 17: A system according to any of Aspects 12 to 16, further comprising a heat exchanger configured to indirectly transfer heat energy from the compressed feed gas to the carbon dioxide-depleted stream.

BRIEF DESCRIPTION OF THE DRAWINGS

The present invention will hereinafter be described in conjunction with the appended figures wherein like numerals denote like elements.

DETAILED DESCRIPTION

The ensuing detailed description provides preferred exemplary embodiments only, and is not intended to limit the scope, applicability, or configuration of the invention. Rather, the ensuing detailed description of the preferred exemplary embodiments will provide those skilled in the art with an enabling description for implementing the preferred exemplary embodiments of the invention. Various changes may be made in the function and arrangement of elements without departing from the spirit and scope of the invention, as set forth in the appended claims.

The articles "a" or "an" as used herein mean one or more when applied to any feature in embodiments of the present invention described in the specification and claims. The use of "a" and "an" does not limit the meaning to a single feature unless such a limit is specifically stated. The article "the" preceding singular or plural nouns or noun phrases denotes a particular specified feature or particular specified features and may have a singular or plural connotation depending upon the context in which it is used.

The term "and/or" placed between a first entity and a second entity includes any of the meanings of (1) only the first entity, (2) only the second entity, or (3) the first entity and the second entity. The term "and/or" placed between the last two entities of a list of 3 or more entities means at least one of the entities in the list including any specific combination of entities in this list. For example, "A, B and/or C" has the same meaning as "A and/or B and/or C" and comprises the following combinations of A, B and C: (1) only A, (2) only B, (3) only C, (4) A and B but not C, (5) A and C but not B, (6) B and C but not A, and (7) A and B and C.

The terms "depleted" or "lean" mean having a lesser mole percent concentration of the indicated component than the original stream from which it was formed. "Depleted" and "lean" do not mean that the stream is completely lacking the indicated component.

The terms "rich" or "enriched" mean having a greater mole percent concentration of the indicated component than the original stream from which it was formed.

The term "indirect heat exchange" refers to the process of transferring sensible heat and/or latent heat between two or more fluids without the fluids in question coming into physical contact with one another. The heat may be transferred via any number of suitable means, including through the wall of a heat exchanger or with the use of an intermediate heat transfer fluid. The term "hot stream" refers to any stream that exits the heat exchanger at a lower temperature than it entered. Conversely, a "cold stream" is one that exits the heat exchanger at a higher temperature than it entered.

Figure 1A:
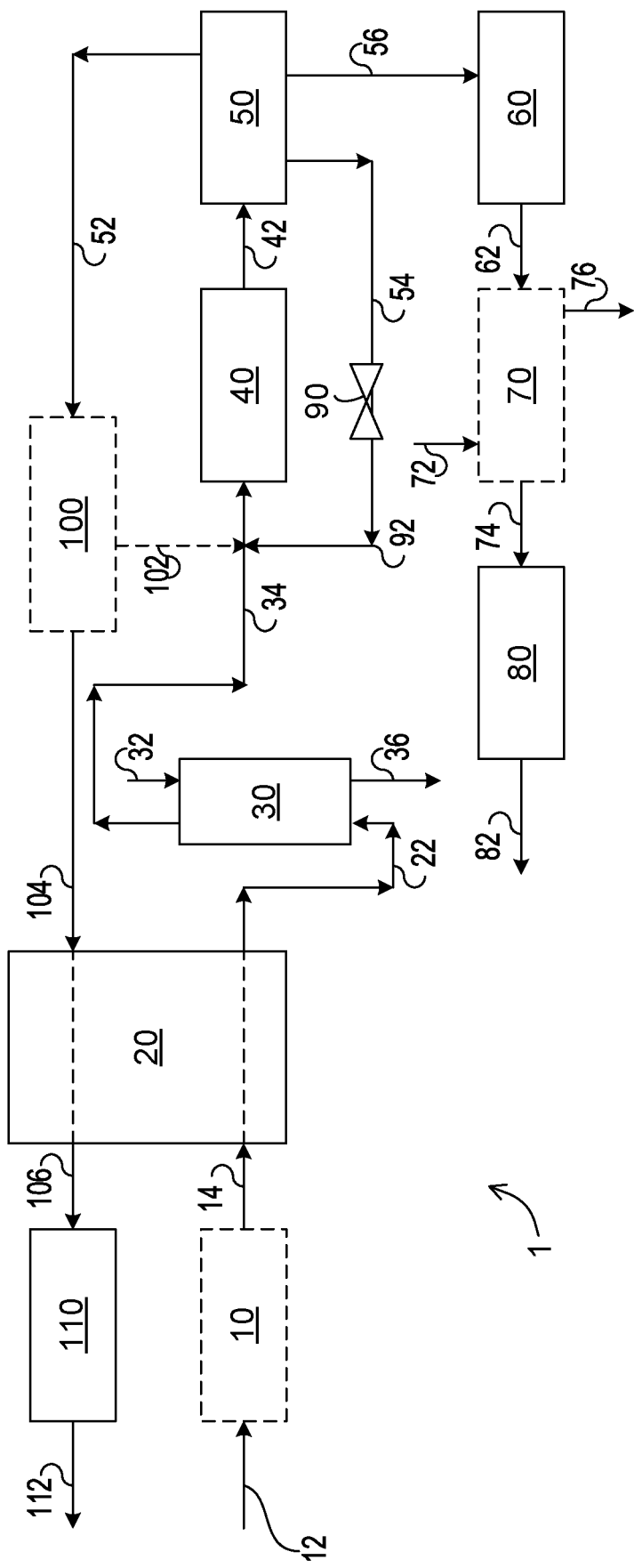
FIG. 1A is a flowsheet depicting a carbon capture process according to an example embodiment of the present disclosure.

FIG. 1A shows a carbon capture process 1. A flue gas stream 12 comprising carbon dioxide may optionally be compressed in blower 10 in the case that the flue gas stream 12 is at a low pressure, for example near ambient pressure. An increase in pressure of about 0.2 to 0.3 bar is typically enough to overcome the pressure drop of downstream processes, but may be as high as 1 bar. Unless otherwise specified, in the present disclosure all pressure changes will be given in units of bar. The flue gas stream may come from any suitable carbon dioxide-emitting source, such as a steam methane reformer, furnace, gas turbine, power generation plant, cement plant, lime production plant, refinery processing step (e.g. fluid catalytic cracker or FCC), and/or steel manufacturing plant.

The flue gas stream 14 may then enter a heat exchanger 20 to cool the stream by indirect heat exchange. In at least some embodiments, cooled flue gas stream 22 may then enter a quench tower 30 where it is contacted with quench water stream 32 if required to remove impurities. In at least some embodiments, the quench tower 30 may be replaced with another type of cooler if temperature reduction is required but impurity removal is not. The quench water stream 32 may also contain additives such as basic compounds to improve removal efficiency of compounds such as nitrogen oxides and sulfur oxides from the cooled flue gas stream 22. Feed gas 34 leaves the quench tower 30 with a reduced concentration of impurities such as nitrogen oxides, sulfur oxides, and particulate matter, and enters feed gas compressor 40. Feed gas 34 also has a lower water content than cooled flue gas stream 22 due to the lower temperature imparted by the quench tower 30. Spent quench water stream 36 leaves the quench tower and may be treated and/or recycled.

The feed gas 34 is compressed in feed gas compressor 40 to produce a compressed feed gas 42 at a pressure between about 2 and 30 bara, or between about 2.5 and 20 bara, or between about 4 and 16 bara, or between about 8 and 12 bara. The feed gas compressor 40 may comprise multiple stages and may be equipped with inter-stage coolers to maintain the compressed feed gas 42 at near ambient temperature. Any water that condenses during compression and cooling may be removed by any suitable water-removal means such as a knockout tank (not shown).

The compressed feed gas 42 enters an adsorption system 50 which separates the compressed feed gas 42 using an adsorption process. The adsorption system 50 may be a plurality of adsorbent beds packed with one or more adsorbents with a higher affinity to $CO_2$ compared to other species in the compressed feed gas 42 such as $N_2$. The adsorption process may be carried out in axial flow adsorbent beds or radial flow adsorbent beds. The adsorption system 50 may employ a vacuum pressure swing adsorption (VPSA) cycle comprising, in sequence, (a) a feed step, (b) a pressure decreasing equalization step, (c) a blowdown step, (d) an evacuation step, (e) a pressure increasing equalization step, and (f) a repressurization step.

Figure 1B:
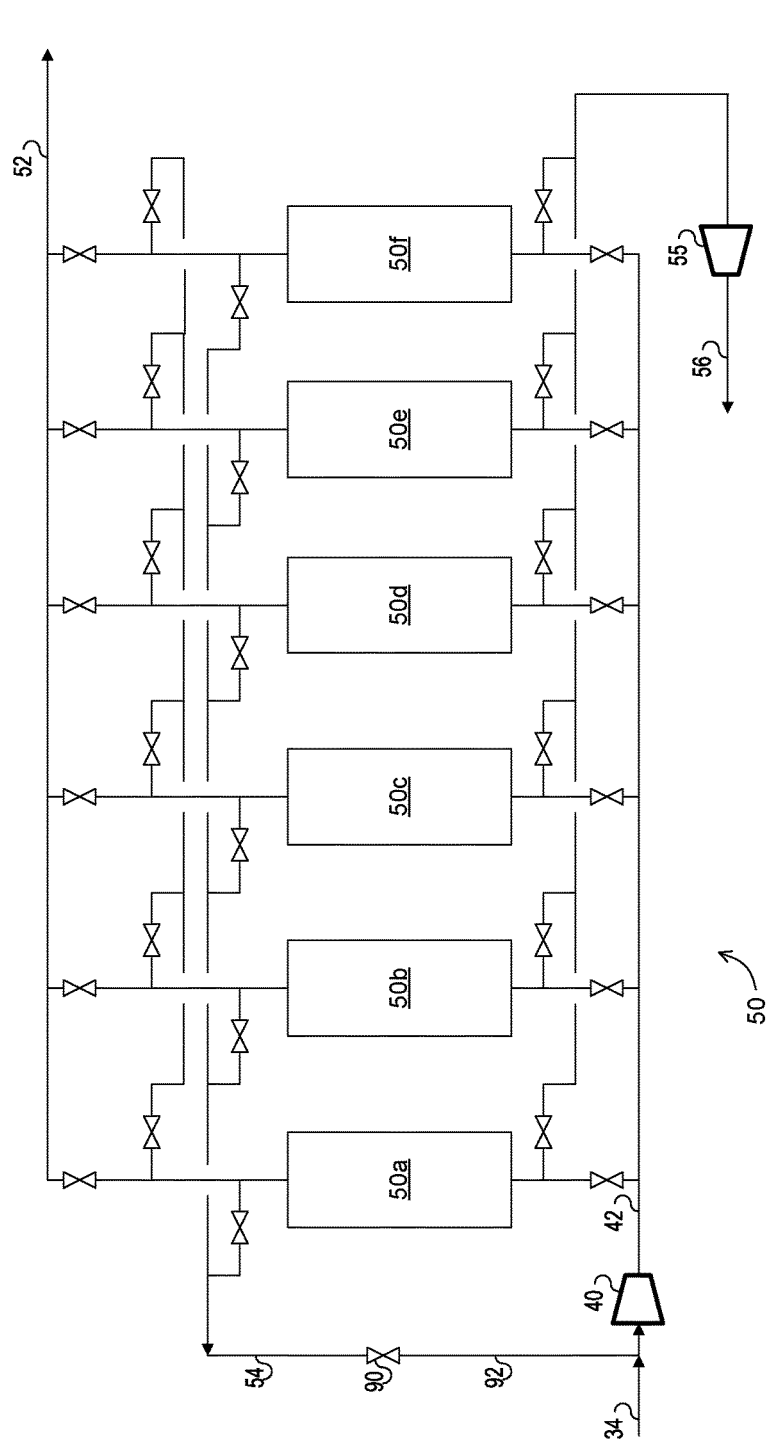
FIG. 1B is a flowsheet depicting the cycle for a six-bed vacuum pressure swing adsorption (VPSA) process.

FIG. 1B shows the VPSA cycle for a case in which the adsorption system 50 comprises six beds labeled 50a through 50f. In at least some embodiments, the feed step (a) comprises introducing the compressed feed gas 42 at a pressure between about 2 and 30 bara and at a temperature between 4 and 100° C. into an adsorption bed 50a comprising an adsorbent selective for $CO_2$. In at least some embodiments, the compressed feed gas 42 may enter the adsorption bed 50a at a near ambient temperature. Suitable $CO_2$-selective adsorbents include standard zeolite 13X (the sodium form of the type X crystal structure of aluminosilicate), non-standard zeolite 13X (in which a portion of the sodium ions have been back-exchanged and/or a different binder is used), CaX, metal-organic frameworks (MOF), metal-organic materials (MOM), LiLSX, NaX, NaMSX, NaLSX, NaY, alumina, activated carbon, silica gel, and mixtures thereof. A carbon dioxide-depleted stream 52 is withdrawn from the adsorption bed 50a. In the example of standard zeolite 13X, the feed step may occur over a time period of 30 seconds to 600 seconds. The time period may be found by monitoring one or more of any suitable process parameters, such as the amount of carbon dioxide in the carbon dioxide-depleted stream 52 for when it exceeds a predetermined purity specification, known as breakthrough, the purity of a carbon dioxide product stream, and/or the overall carbon dioxide recovery of the process, the pressure at the end of the blowdown step, the pressure at the end of the evacuation step, the adsorbent capacity, the adsorbent selectivity, the partial pressure of $CO_2$ in the compressed feed gas 42, the number of pressure equalization steps, and the cost of power. In general, decreasing the time period reduces the bed height and lowers capital costs, but increases the total power consumed by the system.

The pressure decreasing equalization step (b) comprises stopping the compressed feed gas 42 from entering the adsorption bed 50a, withdrawing a pressure equalization gas from the adsorption bed 50a and passing the pressure equalization gas to an adsorption bed undergoing the pressure increasing equalization step. In at least some embodiments, the pressure equalization gas may be withdrawn co-currently, defined as gas flowing through the bed in the same flow direction as the feed step (a). In at least some embodiments, co-current flow during pressure equalization results in higher overall $CO_2$ recovery compared to counter-current flow, where the gas flows through the bed in the opposite direction to the feed step (a). The highest concentrations of $CO_2$ are at the feed end of the bed so when the pressure equalization gas is withdrawn co-currently, more $CO_2$ is retained on the bed which improves $CO_2$ recovery and/or $CO_2$ product purity. There is a tradeoff between $CO_2$ recovery and $CO_2$ product purity which may be affected by changing the cycle time. One or more pressure decreasing equalization steps may be used. In the six-bed cycle shown in FIG. 1B, there are three pressure decreasing equalization steps: eq1d, eq2d, and eq3d. In sequential order, in step eq1d the adsorption bed 50a is connected to adsorption bed 50e on pressure increasing equalization step eq1r, in step eq2d the adsorption bed 50a is connected to adsorption bed 50d, and finally in step eq3c the adsorption bed 50a is connected to adsorption bed 50c. When the two adsorption beds are connected they reach an intermediate pressure defined as when the two pressures are within the pressure drop of the piping between them.

The blowdown step (c) comprises withdrawing a blowdown gas 54 from the adsorption bed 50a until the pressure of the adsorption bed is reduced from the intermediate pressure to a pressure between 1 and 1.5 bara. In at least some embodiments, a co-current blowdown step improves $CO_2$ recovery and/or $CO_2$ purity over a counter-current blowdown step in which the blowdown gas travels in the opposite flow direction as the feed step (a). This is for the same reason as withdrawing pressure equalization gas co-currently: more $CO_2$ remains on the adsorbent bed 50a. In at least some embodiments, a counter-current blowdown step may be employed to reduce the risk of bed fluidization. The blowdown gas 54 may be recycled by combining with the feed gas 34 or directly introducing to the inlet or an interstage of the feed gas compressor 40 to improve overall $CO_2$ recovery and/or $CO_2$ purity without requiring a dedicated blowdown compressor. In at least some embodiments, the blowdown gas 54 may be optionally reduced in pressure across pressure reducer 90 before the resulting expanded blowdown gas 92 is compressed in the feed gas compressor 40. The pressure reducer 90 may be used to decouple the pressure of the blowdown step (c) to the pressure of the feed gas 34 and add operational flexibility. Surprisingly, in at least some embodiments the overall efficiency of the process can be improved even when the blowdown gas 92 is reduced in pressure prior to compression because the feed gas compressor 40 is a larger machine with a higher efficiency than a dedicated blowdown compressor. Compared to the process of Hsu et al. that uses a dedicated blowdown compressor, the process 1 of the present disclosure has further benefits in the form of improved reliability due to the elimination of rotating equipment. In at least some embodiments, recycling the blowdown gas 54 to the feed gas compressor 40 allows multiple trains of the adsorption system 50 to be recycled to a single compressor, which also improves the balance of controlling multiple trains compared to the use of dedicated blowdown compressors as taught in Hsu et al.

The evacuation step (d) comprises withdrawing a carbon dioxide-enriched product stream 56 from the adsorption bed 50a at an evacuation pressure sufficient to desorb the carbon dioxide from the adsorbent, and subsequently compressing the carbon-dioxide enriched product stream in any suitable compressor, vacuum blower, or similar device. In the example embodiment shown in FIG. 1B, the carbon dioxide-enriched product stream 56 is withdrawn counter-currently from the adsorption bed 50a using vacuum blower 55. Because the highest concentrations of $CO_2$ are at the feed end of the adsorbent bed 50a, withdrawing the carbon dioxide-enriched product stream 56 counter-currently may provide greater efficiency. In at least some embodiments, a counter-current evacuation step may be employed to reduce the risk of bed fluidization. The end of the evacuation pressure may range from 0.05 to 0.5 bara depending on the capacity of the vacuum blower and the required carbon dioxide recovery. Lower evacuation pressures will require a larger vacuum blower but will provide a higher carbon dioxide recovery. The carbon dioxide-enriched product stream 56 may be passed to one or more surge tanks (not shown), if desired to reduce fluctuations in flow and/or pressure.

The pressure increasing equalization step (e) comprises introducing the pressure equalization gas from an adsorption bed undergoing the pressure decreasing equalization step to the adsorption bed 50a undergoing the pressure increasing equalization step. In at least some embodiments, the pressure equalization gas is introduced counter-currently to simplify the connection to the adsorption bed undergoing a pressure decreasing equalization step and reduce the pressure drop between the two connected adsorption beds. One or more pressure increasing equalization steps may be used. In the example embodiment shown in FIG. 1B, three pressure increasing equalization steps are used in which the adsorption bed 50a is first connected to adsorption bed 50e for step eq3r, then adsorption bed 50d for step eq2r, finally adsorption bed 50c for step eq1r. When the two adsorption beds are connected they reach an intermediate pressure as described in the pressure decreasing equalization step (b).

The repressurization step (f) comprises increasing the pressure in the adsorption bed 50a to a pressure substantially equal to the pressure of the compressed feed gas 42. The pressure may be increased by introducing at least one of the compressed feed gas 42 and a portion of the carbon dioxide-depleted stream 52. In the example embodiment shown in FIG. 1B, the adsorption bed 50a is repressurize counter-currently with a portion of the carbon dioxide-depleted stream 52 to reduce CO2 losses and improve overall CO2 recovery. The difference in pressure between the adsorption bed 50a and the compressed feed gas 42 is accounted for by the pressure drop in the lines between the carbon dioxide-depleted stream 52 and the adsorption bed 50a. At the end of the repressurization step (f) the adsorption bed 50a is ready to complete the cycle and begin the feed step (a).

The carbon dioxide-enriched product stream 56 is compressed in one or more stages of compression in a first carbon dioxide compressor 60. In at least some embodiments, the compressed carbon dioxide stream 62 may then be purified in carbon dioxide purification unit 70. The carbon dioxide purification unit 70 may comprise a deoxygenation unit and/or a dehydration unit according to the purity specification of the downstream carbon dioxide application. In at least some embodiments, the carbon dioxide purification unit 70 comprises a deoxygenation unit that reacts the compressed carbon dioxide stream 62 with a reducing agent 72, such as hydrogen, to consume oxygen and separates a reaction byproduct stream 76, such as water. The purified carbon dioxide stream 74 may optionally be compressed further in second carbon dioxide compressor 80 to form a carbon dioxide product stream 82 suitable for sequestration, storage, enhanced oil recovery, utilization, and/or liquefaction. In at least some embodiments, one or more stages of compression may be replaced with a pump if the carbon dioxide product enters the liquid phase.

In at least some embodiments, the carbon dioxide-depleted stream 52 may optionally feed a membrane separation system 100 which may comprise a single membrane stage or a plurality of membrane stages in series and/or parallel. The carbon dioxide-depleted stream is separated by selective permeation into a carbon dioxide-enriched permeate stream 102 and a carbon dioxide-lean retentate stream 104. Carbon dioxide selectively permeates the membrane over slower species such as nitrogen. In at least some example implementations, the higher solubility of carbon dioxide in the membrane material results in a faster permeation rate than similar-sized molecules with lower solubility such as nitrogen.

Sanders et al (Polymer; vol 54; pp 4729-4761; 2013) provide a convenient summary of current membrane technology. They describe the physical parameters and performance characteristics of polymeric membranes including polystyrene, polysulfone, polyethersulfone, polyvinyl fluoride, polyvinylidene fluoride, polyether ether ketone, polycarbonate, polyphenylene oxide, polyethylene, polypropylene, cellulose acetate, polyimide (such as Matrimid 5218 or P-84), polyamide, polyvinyl alcohol, polyvinyl acetate, polyethylene oxide, polydimethylsiloxane, copolymers, block copolymers, or polymer blends. Existing industrially useful gas separations are performed primarily with polymers such as those listed above or rubbery materials such as silicone. Additional membrane materials may comprise mixed-matrix membranes, perfluoropolymers, thermally rearranged polymers, facilitated transport membranes, metal-organic frameworks, zeolitic-imidazolate frameworks, electrochemical membranes, metallic membranes, and carbon molecular sieves. The membrane material in the membrane separation system 100 can be any of those listed above, or any other material that has a faster permeation rate for some compounds such as carbon dioxide and a slower permeation rate for some compounds such as nitrogen.

Suitable membrane materials may be manufactured as hollow fibers and packaged as membrane bundles, or may be manufactured as flat sheets, packaged as spiral-wound or plate-and-frame units, in order to provide a larger surface area to volume ratio, and housed in a module. Gas entering the module contacts the membrane, and a fraction of the gas permeates through the membrane and leaves the module in the lower-pressure permeate stream. The faster permeating gases will be enriched in the permeate relative to the slower permeating gases. The fraction of the gas that does not permeate through the membrane leaves the module in the non-permeate, or retentate, stream which is enriched in the slower permeating gases relative to the faster permeating gases. A membrane stage is defined as one or more membrane modules arranged so that each feed inlet is in fluid flow communication with one another, each permeate outlet is in fluid flow communication with one another, and each retentate outlet is in fluid flow communication with one another.

The carbon dioxide-enriched permeate stream 102 may be recycled by combining with the feed gas 34 or directly introducing to the inlet or an interstage of the feed gas compressor 40 to improve overall recovery without requiring a dedicated permeate compressor. The carbon dioxide-lean retentate stream may be heated in the heat exchanger 20 against the flue gas stream 14. The heated carbon dioxide-lean stream 106 may then be expanded in expander 110 to produce vent gas 112. The expander 110 comprises one or more stages with optional interstage heating to generate power which may be used to drive the feed gas compressor 40 or generate electricity. In at least some embodiments, the source of the interstage heating may be provided by the heat exchanger 20, interstage cooling from feed gas compressor 40, interstage cooling from first carbon dioxide compressor 60, interstage cooling from second carbon dioxide compressor 80, and/or waste heat from upstream and/or downstream processes.

Figure 2:
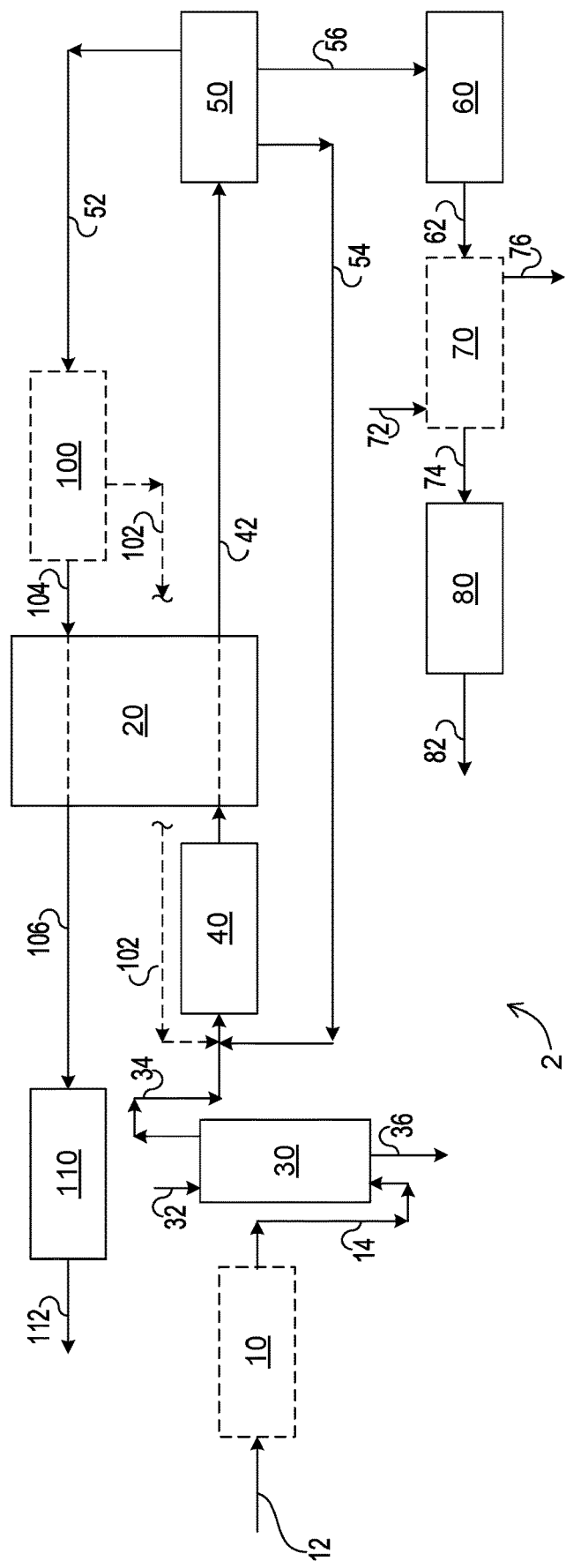
FIG. 2 is a flowsheet depicting a modification of the embodiment in FIG. 1A in which the quench and feed compressor are located upstream of the heat exchanger.

The flowsheet shown in FIG. 2 illustrates an embodiment of a carbon capture process 2 in which the heat exchanger 20 is moved downstream of the quench tower 30 and the feed gas compressor 40. This arrangement allows the capture of the heat generated by the feed gas compressor 40 by the heated carbon dioxide-lean stream 106 which in turn may be recovered as useful work in the expander 110.

Figure 3:
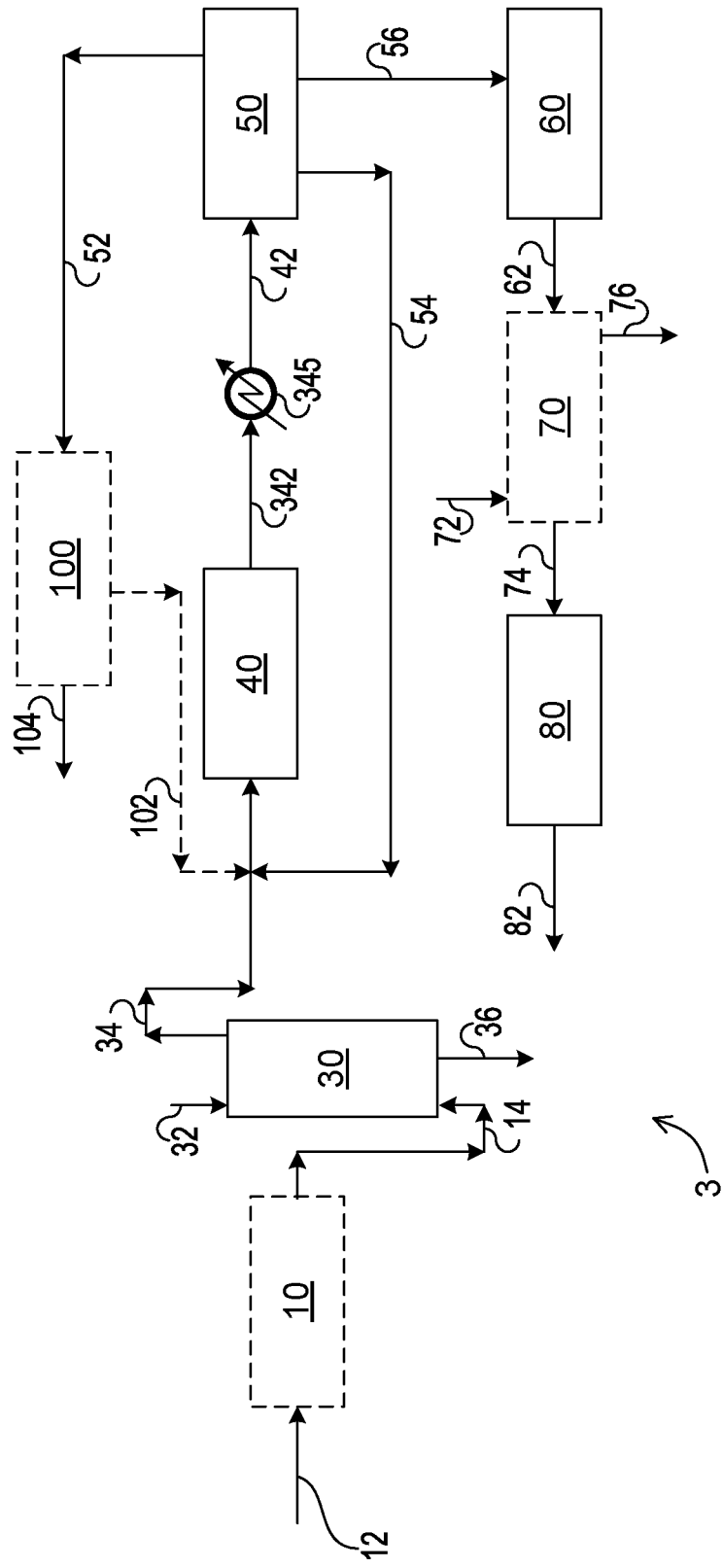
FIG. 3 is a flowsheet depicting a modification of the embodiment in FIG. 1A in which the heat exchanger is eliminated.

The flowsheet shown in FIG. 3 illustrates an embodiment of a carbon capture process 3 in which the heat exchanger 20 is eliminated. In at least some embodiments, additional cooling duty may be provided to a warm compressed feed gas 342 by a chiller 345 to produce the compressed feed gas 42. The capital cost of the system is reduced by eliminating the heat exchanger, and the operability of the system is greatly simplified, at the cost of reduced overall efficiency. Eliminating the heating of the carbon dioxide-lean retentate stream 104 reduces the amount of energy that could be captured by expanding the stream.

Figure 4:
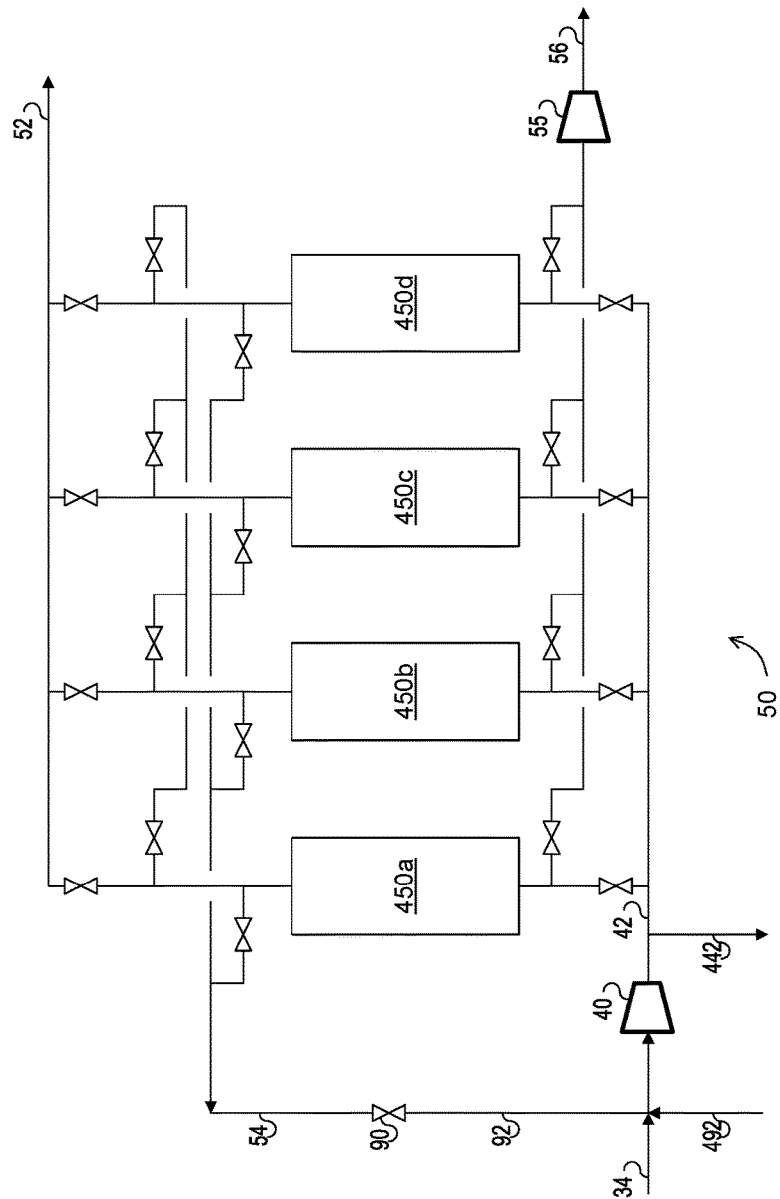
FIG. 4 is a flowsheet depicting the cycle for a four-bed vacuum pressure swing adsorption process.

The flowsheet shown in FIG. 4 illustrates a section 4 of a carbon capture process with multiple trains of adsorption. In the example embodiment shown in FIG. 4, the adsorption system 50 comprises four adsorption beds 450a through 450d. As can be seen in the cycle chart, the primary change compared to the six-bed cycle in FIG. 1B is the single pressure equalization step. At least a portion of the compressed feed gas 42 is divided to form a compressed feed gas header 442 that supplies compressed feed gas to one or more parallel trains of adsorption. A vacuum blower 455 is shown to allow the evacuation step to reach sub-ambient pressures. A blowdown gas header 492 recycles blowdown gas from the one or more parallel trains of adsorption to the shared feed gas compressor 40.

Example 1

A carbon capture process according to FIG. 1A with the 4-bed cycle shown in FIG. 4 was simulated using an in-house process simulator, SIMPAC. A flue gas 14 saturated with water at 1 bara pressure and 187° C., comprising 19% $CO_2$ and 61% $N_2$ by volume with the balance $O_2$ and trace Ar, is cooled, quenched, and compressed to 8 bara. The compressed feed gas 42 exits the feed gas compressor 40 at 46° C. A knockout tank removes liquid water, and the compressed feed gas 42 enters an adsorption bed on the feed step. The adsorption beds are packed with a commercially available alumina and a commercially available standard 13X zeolite. When the adsorption bed on the feed step is almost saturated with water and/or $CO_2$, the compressed feed gas 42 is switched to feed another adsorption bed. The time period of the feed step was chosen to achieve an overall $CO_2$ recovery of 90.6%. The adsorption bed that was on the feed step is connected to an adsorption bed at below atmospheric pressure that has just completed the evacuation step. When the two beds reach an intermediate pressure of about 3.5 bara, the pressure equalization step is completed. The adsorption bed that was on the pressure decreasing equalization step is connected to pressure reducer 90 and the blowdown gas exiting the adsorption bed is recycled to the feed gas compressor 40 until the pressure of the adsorption bed reaches 1.34 bara. The adsorption bed that was on the blowdown step is connected to the vacuum blower 455 and evacuated to a pressure of about 0.13 bara, producing the carbon dioxide-enriched product stream 56 at a purity of 96.8% $CO_2$. After the completion of the evacuation step, the adsorption bed is connected to an adsorption bed on a pressure decreasing equalization step until the pressure increases to about 3.5 bara. The adsorption bed is then fed with at least a portion of the carbon dioxide-depleted stream 52 until the bed is re-pressurized to within 10% of the feed pressure of 8 bara. This completes the cycle and the adsorption bed can be connected to the compressed feed gas 42.

Example 2

A carbon capture process according to FIG. 1A with the 6-bed cycle shown in FIG. 1B was simulated using an in-house process simulator, SIMPAC. A feed stream 34 comprising 70% $N_2$, 25% $CO_2$, and 5% $O_2$ is compressed to 10 bara in a four-stage centrifugal feed compressor 40 and enters the adsorption system 50 at a flow rate of 20,000 lbmol/hr at 50° C. Each of the six 14-ft diameter adsorbent beds are packed with commercially available standard zeolite 13X to a height of 22 ft. The total cycle time is 20 min.

Over the course of the evacuation step, the vacuum blower removes about 24,000 acfm of carbon dioxide-enriched product stream 56 from the bottom of the adsorption beds. The evacuation step is completed at a pressure of about 0.17 bara, a level of vacuum achievable with a commercially available three-stage screw compressor serving as vacuum blower 55.

The carbon dioxide-depleted stream 52 comprises 92.5% $N_2$ and the carbon dioxide-enriched product stream 56 comprises 95% $CO_2$. The overall process achieves 97% $CO_2$ recovery and 98% $N_2$ recovery.

Compressing the blowdown gas 54 in the feed compressor 40 adds 268 kW to the overall power demand, however compressing the blowdown gas 54 in a dedicated blowdown screw compressor would add 313 kW. Thus, utilizing the feed compressor 40 to recycle the blowdown gas 54 saves about 15% in power, reduces capital costs by eliminating equipment, improves reliability, and simplifies the design.

Figure 5:
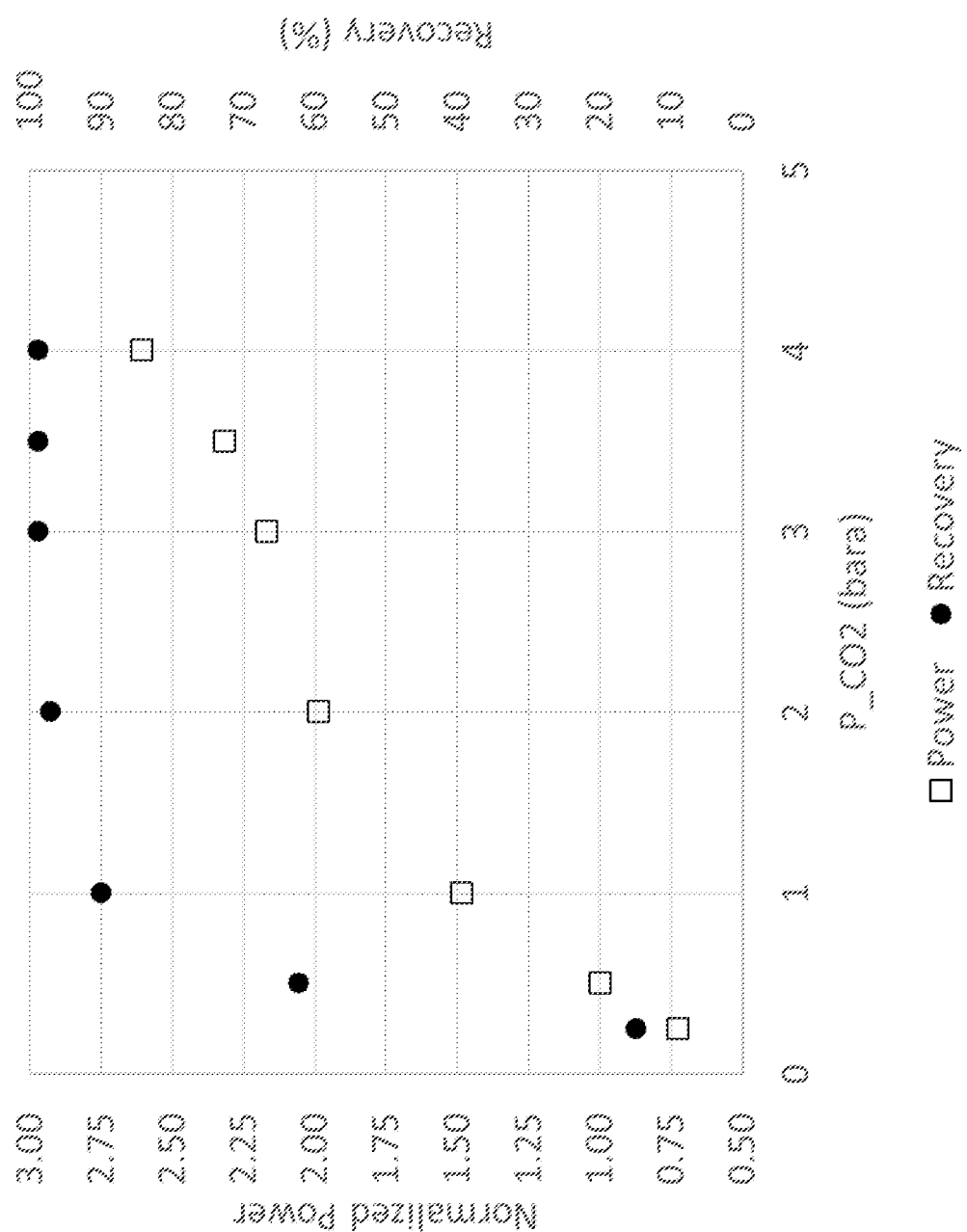
FIG. 5 is a plot of power and CO2 recovery as a function of partial pressure of CO2 in the feed to the VPSA for a standard zeolite 13X material.

FIG. 5 shows a plot of power demand and $CO_2$ recovery for a series of values of the partial pressure of $CO_2$ in the compressed feed gas 42. Each case was simulated using the feed described above and adjusting the height of the adsorbent bed and the final evacuation pressure to maximize recovery while maintaining the purity of the carbon dioxide-enriched product stream 56 to be at least 90% $CO_2$. The total power of the carbon capture process 1 is normalized to 1 for the case of $P_{CO2}$ equal to 0.5 bara. As the partial pressure of $CO_2$ increases, both power requirements and $CO_2$ recovery improve. For $P_{CO2}$ below 0.5 bara $CO_2$ recovery is too low to be viable, but for $P_{CO2}$ above 3.5 bara a sharp increase in power is seen for negligible improvements in $CO_2$ recovery. Above 1 bara the $CO_2$ recovery is considered high. This is unexpected as higher $P_{CO2}$ Values Typically Improve the Driving Force for carbon capture processes.

Example 3

Figure 6:
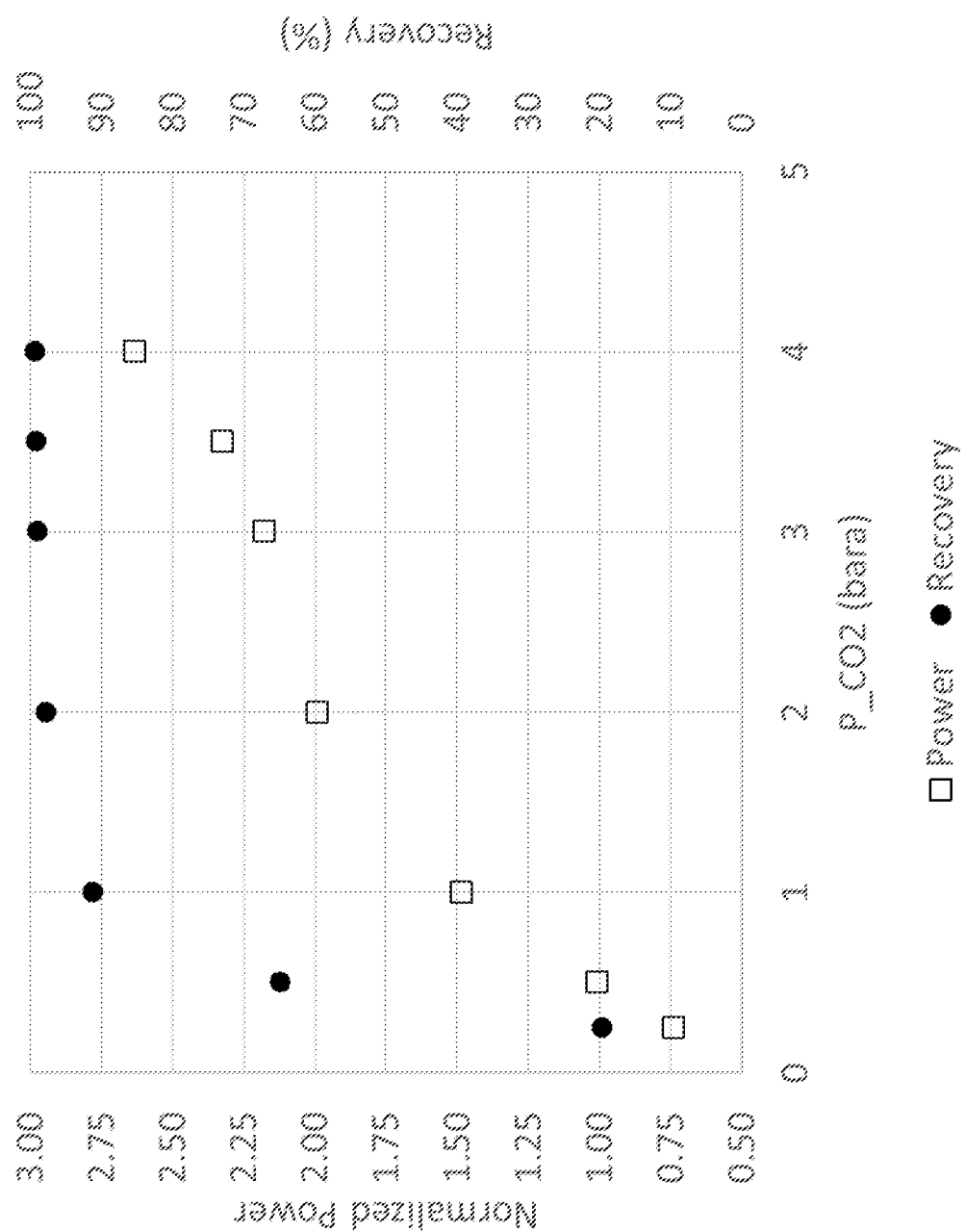
FIG. 6 is a plot of power power and CO2 recovery as a function of partial pressure of CO2 in the feed to the VPSA for a NaY zeolite material.

FIG. 6 shows a plot of power demand and $CO_2$ recovery for a series of values of the partial pressure of $CO_2$ in the compressed feed gas 42 for a simulation that replaces the standard 13X zeolite material with an equal volume of NaY zeolite. An increase may be seen in overall $CO_2$ recovery. Comparatively, a person of ordinary skill in the art will appreciate the conclusion that similar zeolite adsorbents will provide similar results.

While the principles of the invention have been described above in connection with preferred embodiments, it is to be clearly understood that this description is made only by way of example and not as a limitation of the scope of the invention.

The invention claimed is:
1. A process for separating carbon dioxide from a feed gas comprising carbon dioxide, the process comprising:
compressing the feed gas in a feed gas compressor to produce a compressed feed gas;
separating the compressed feed gas by an adsorption process comprising: using a plurality of adsorbent beds to produce a carbon dioxide-enriched product stream and a carbon dioxide-depleted stream, and a blowdown step during which a blowdown gas is removed from the adsorbent bed; and compressing the blowdown gas in the feed gas compressor and combining the blowdown gas with the compressed feed gas.

2. The process of claim 1, further comprising reducing the pressure of the blowdown gas prior to compression in the feed gas compressor.

3. The process of claim 1, further comprising expanding the carbon dioxide-depleted stream to generate power.

4. The process of claim 1, further comprising expanding a stream derived from the carbon dioxide-depleted stream to generate power.

5. The process of claim 1, further comprising indirectly transferring heat energy from the compressed feed gas to the carbon dioxide-depleted stream.

6. The process of claim 1, wherein the partial pressure of carbon dioxide in the compressed feed gas is maintained between 0.5 and 3.5 bara.

7. The process of claim 1, wherein the adsorbent bed comprises a standard zeolite 13X material, a NaY zeolite material, or combinations thereof.

8. A process for separating carbon dioxide from a feed gas comprising carbon dioxide comprising:

compressing the feed gas to produce a compressed feed gas;

separating the compressed feed gas by an adsorption process comprising: using a plurality of adsorbent beds comprising an adsorbent material to produce a carbon dioxide-enriched product stream and a carbon dioxide-depleted stream;

wherein the partial pressure of carbon dioxide in the compressed feed gas is maintained within a given pressure range, wherein the given pressure range is a function of the adsorbent material.

9. The process of claim 8, wherein the adsorbent bed comprises a standard zeolite 13X material, and wherein the given pressure range is between 0.5 and 3.5 bara.

10. The process of claim 8, wherein the adsorbent bed comprises a NaY zeolite material; and wherein the given pressure range is between 0.5 and 3.5 bara.

11. A process for separating carbon dioxide from a feed gas comprising carbon dioxide, the process comprising:

compressing the feed gas in a feed gas compressor to produce a compressed feed gas;

separating the compressed feed gas by an adsorption process comprising: using a plurality of adsorbent beds to produce a carbon dioxide-enriched product stream and a carbon dioxide-depleted stream, and a blowdown step during which a blowdown gas is removed from the adsorbent bed;

compressing the blowdown gas in the feed gas compressor and combining the blowdown gas with the compressed feed gas;

separating the carbon dioxide-depleted stream by selective permeation to produce a carbon dioxide-enriched permeate stream and a carbon dioxide-lean retentate stream; and compressing the carbon dioxide-enriched permeate stream in the feed gas compressor.

* * * * *